April 20, 1937.　　　　　E. F. KING　　　　　2,077,484
COUPLING
Filed March 16, 1935　　　2 Sheets-Sheet 1
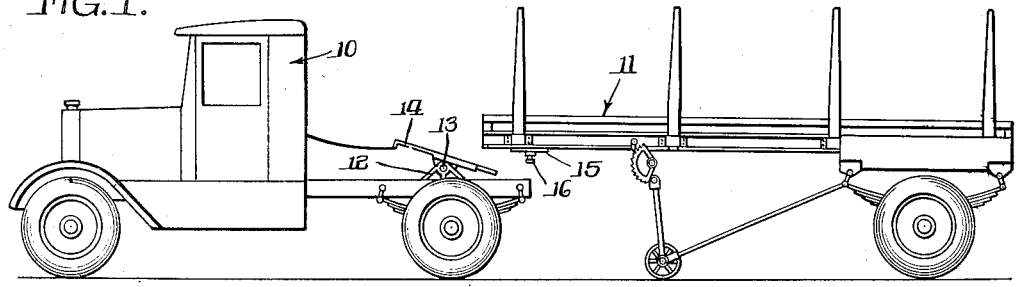
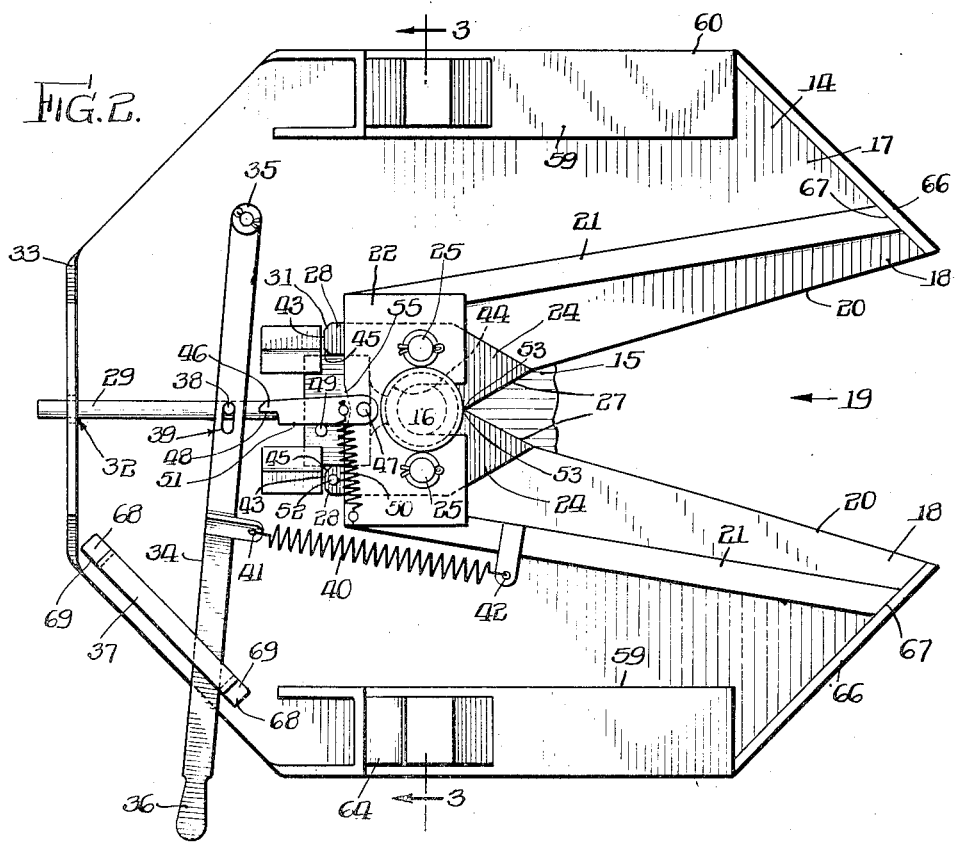
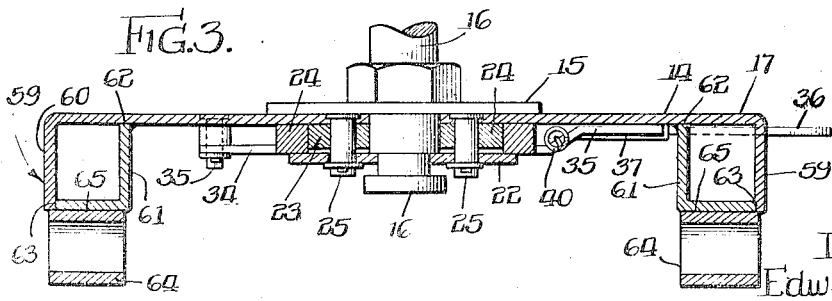
Inventor:
Edward F. King
By: Cox & Moore attys.

April 20, 1937. E. F. KING 2,077,484
COUPLING
Filed March 16, 1935 2 Sheets-Sheet 2
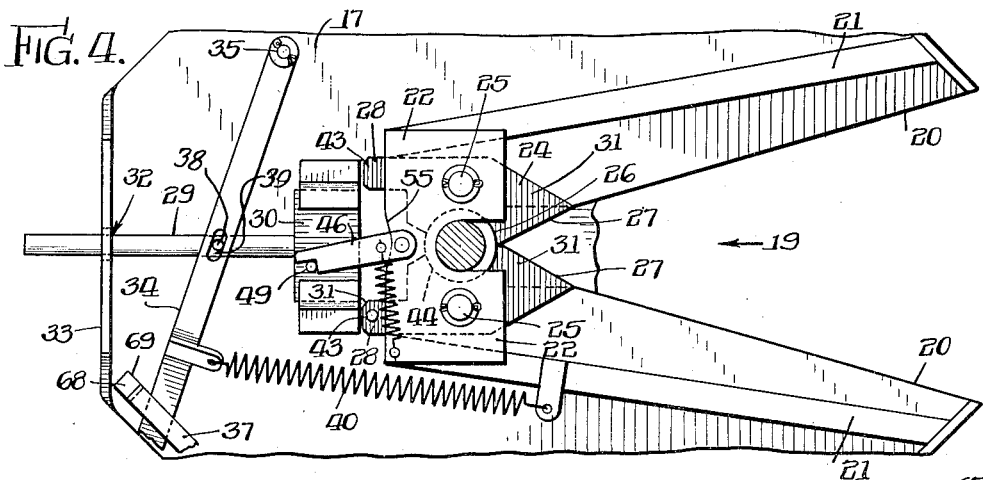
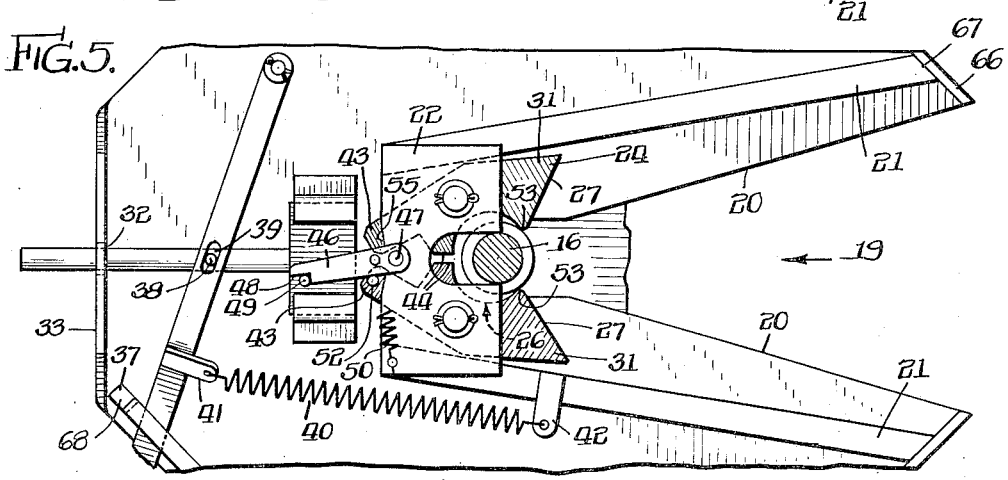
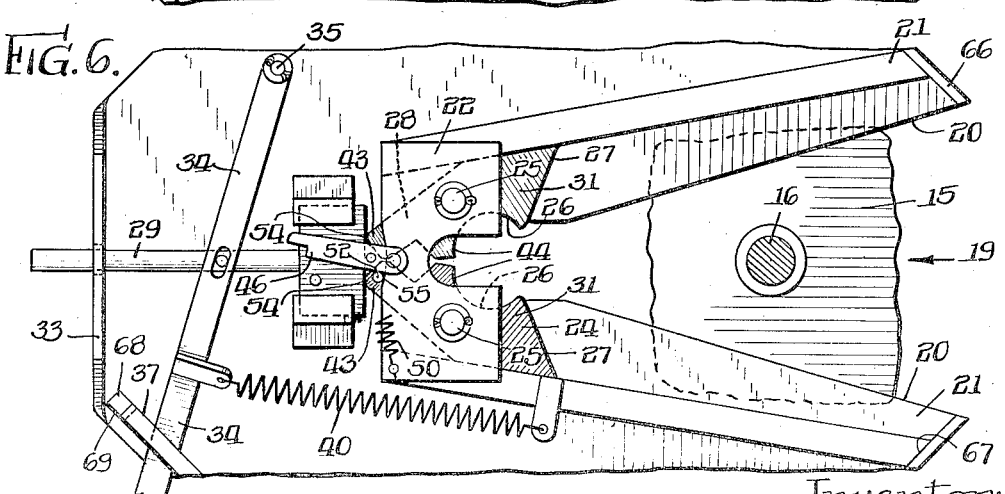
Inventor:
Edward F. King
By: Cox & Moore attys Patented Apr. 20, 1937

2,077,484

UNITED STATES PATENT OFFICE 2,077,484

COUPLING

Edward F. King, Oak Park, Ill., assignor to Available Truck Company, Chicago, Ill., a corporation of Illinois Application March 16, 1935, Serial No. 11,495

7 Claims. (Cl. 280—33.1)

This invention relates to coupling devices and particularly to a coupling construction which is generally known in the art as a fifth wheel, the same being used in connection with trailers and especially semi-trailers. More specifically, the invention relates to a fifth wheel used in connection with semi-trailers being applied to the rear end of a pulling device such as a tractor.

The primary object of the invention is to provide a new and improved construction for a fifth wheel which has positive locking means for securing the king pin of a semi-trailer in locked position when the tractor is backed into proper position, and which is provided with improved means for unlocking the device or fifth wheel to permit the tractor to be moved away from the trailer when required.

Another object of the invention is to provide a fifth wheel which has improved locking mechanism, practically engaging and surrounding the entire circumference of the king pin so that a positive lock will be formed whether the tractor is pushing or pulling the trailer.

Another object is to provide an improved fifth wheel construction which has elements provided thereon for engaging a trailer king pin, which is provided with means for readily and quickly unlocking the device to permit the tractor to be pulled away from the trailer, which is provided with means for holding the locking mechanism in open position, and which is provided with new and improved means for automatically locking the king pin in proper position upon engagement of the king pin with a part of the fifth wheel construction.

Numerous other objects and advantages will be apparent throughout the progress of the following specification.

The accompanying drawings illustrate a selected embodiment of the invention and the views therein are as follows:

Fig. 1 is a detail elevational view showing a tractor and a semi-trailer and embodying the invention.

Fig. 2 is a bottom plan view of the improved fifth wheel in locked position.

Fig. 3 is a detail transverse sectional view on the line 3—3 of Fig. 2.

Fig. 4 is a detail bottom plan view of the fifth wheel in unlocked position.

Fig. 5 is a detail bottom plan view showing the parts in unlocked position with the king pin of the semi-trailer moving away from the fifth wheel and partly out of engagement.

Fig. 6 is a detail bottom plan view showing the parts in their normal inoperative non-locking position.

The fifth wheel, herein shown for the purpose of illustration, is for the purpose of connecting a tractor 10 to a trailer 11. The tractor and trailer may be of the conventional design, the particular trailer herein shown being known as a semi-trailer. The tractor 10 is provided with upstanding brackets 12 carrying a transverse shaft or axis 13 upon which a bolster plate 14 is pivotally mounted to permit forward and rearward tilting movement of the bolster plate. The trailer 11 is also provided with a bolster plate 15 to which a king pin 16 is rigidly secured in any desirable or convenient manner. The bolster plate 14 on the tractor comprises a metal body member 17 which has rearwardly extending legs 18, there being a space 19 between the legs to provide a recess or slot into which the king pin 16 of the semi-trailer is adapted to extend. The king pin 16 is guided by the inclined walls 20 of the legs 18 along the edge of the slot or opening 19.

The metal body member 17 is provided with spaced inclined reenforcing bars 21, which are used to strengthen the device and which comprise a support for some of the mechanism. The bars 21 are preferably square bars fixed to the body 17 in any suitable rigid manner such as by welding. A plate 22 is rigidly secured to the bars at the inner ends thereof, near the end of the slot or opening 19. A space or recess 23, Fig. 3, is thereby provided for the reception of dogs 24. These dogs are arranged on opposite sides of the slot as clearly shown in the several figures, particularly in Fig. 6. The dogs 24 are pivotally mounted on pins 25 which pass through the body of the plate 22 and the main body 17. These dogs are constructed to provide semi-circular jaws 26, Fig. 6, and inclined bevel walls 27 which act as cam surfaces against which the king pin 16 engages when the tractor is moved toward the trailer for locking the two vehicles together. The ends of the dogs 24 are provided with fore legs 28.

A draw bolt 29 having a block end 30 is slidably mounted on the body 17 and is adapted to extend between the front legs 28 to hold these said legs apart and to bring the forward ends 31 of the dogs together. The bar 29 may extend through an opening 32 provided in a flange 33 formed on the body. Spaced Z-bars are provided to form a guideway for the block 30. Thus the bolt which includes the bar 29 and the bolt 30 are free to have slidable movement with respect to the dogs 24, particularly the fore legs 28 thereof. The draw bolt 29 including the block 30 may be manually operated by a lever or arm 34, which is pivoted at 35 to a leg rigidly fixed to the underside of the body 17. The operating end or handle 36 of this lever or arm 34 extends between the underside of the body 17 and the upper side of a spaced strap 37, the ends of the strap 37 limiting the movement of the arm or lever 34. Thus the movement of the rod and block 30 is limited by the movement of the lever 34 because the rod 29 is operatively connected to the arm or lever 34 by a slot and pin connection, a pin 38 on the rod extending through a slot 39 in the arm or lever 34.

A spring 40 has one of its ends connected to the bar or lever 34, as indicated at 41, Fig. 2, and its other end fixed to one of the bars 21, as indicated at 42. The lever 34 is therefore urged in a predetermined direction by the spring 40 and, inasmuch as the lever 34 is connected to the rod 29, it may be said that the spring 40 urges the rod 29 and consequently the block 30 in a predetermined direction toward the dogs 24.

When the parts are in their normal inoperative position, as shown in Fig. 6, with the king pin 16 moved away from the operating elements of the device or from the operating elements of the fifth wheel, or away from the fifth wheel all together, the block 30 will be engaged with the ends 43 of the said legs 28 of the dogs 24 because the spring 40 pulls the block in that direction. When, however, the king pin enters into the slot or space 19 being guided by the side walls 20, the king pin will engage the inwardly extending arcuate cam members 44 on the dogs 24. Continued inward movement of the king pin against these members 44 will cause the front legs 28 of the dogs to spread outwardly and the rear ends of the dogs to come together. When the legs 28 have been spread a predetermined distance apart, a distance substantially equal to the width of the block 30, the block 30 will drop down between the legs, being pulled by the spring 40. To assist in causing the block 30 to drop between the legs 28, the legs 28 are provided with cam surfaces 45, Fig. 2. As soon as this bolt or block 30 drops down between the legs 28 the king pin will be securely locked in position and held by the dogs 24. Therefore, when the tractor pulls the semi-trailer, the king pin will be prevented from spreading the entering portions of the dogs 24 because they will be held apart by the block 30, and the greater the resistance against the edges 26 the more tightly is the block locked between the legs 28.

When it is desired to free the trailer from the tractor the handle 36 is operated, whereby the lever will be caused to swing on its pivot 35 and move the rod 29 outwardly. Movement of the rod 29 outwardly will also cause the block 30, which is fixed thereto, to move outwardly. For the purpose of holding the block 30 out of engagement upon operation of the lever 34 a pawl 46 is provided. This pawl 46 is pivotally connected to the plate 22, as indicated at 47. This pawl has a notched or keeper end 48 which is adapted to become engaged by and receive a pin 49 fixed to the block 30. A spring 50 fixed to the pawl and to a pin on the plate 22 normally tends to keep the edge 51 of pawl 46 against the pin 49. However, during the movement of the block 30 upon movement of the lever 34 the notch or keeper end 48 of the member 46 will receive the pin 49 and be held in this position because the spring 50 pulls the member 46 in a direction toward the pin. The pin 49, however, is normally in engagement with the pawl 46 because the movement of the lever or arm 34 is limited to such an extent that the block 30 is never moved a distance great enough to move the pin beyond the edge of the latch, Fig. 5.

One of the dogs 24 is provided with an outstanding pin 52, which during the movement of the king pin 16 from locked position will be in engagement with the latch 46, Fig. 5. In this position the ends 53 of the dogs 24 will be in engagement with the king pin and will not be spaced a distance equal to the diameter of the king pin. However, this outward movement of the king pin will spread the jaws of each dog 24 apart by pressure against the surface 53. This pressure swings the rear ends of the dogs 24 open and brings the legs 28 together, causing the pin 52 to engage the latch 46 and swing it on its pivot 47 a distance sufficient to move the locking end 48 out of locking engagement with the pin 49. As soon as the locking end 48 of the pawl 46 frees the pin 49 on the block 30, the spring 40, exerting a pull on the arm or lever 34, will cause the block to be pulled downwardly and engage the ends 54 of the legs 28, as clearly shown in Fig. 6, at which time the locking portions of the dogs 24 will be spread and held apart, and the king pin will be free to be moved outwardly without engagement in any way with the operating parts of the fifth wheel.

The edge of the plate 22 is cut away or inclined, as indicated at 55, to permit the pin 52 to engage and operate the pawl 46. The pin 52, therefore, urges the pawl 46 away from the pin 49 and the parts will be maintained in the position shown in Fig. 6 until the king pin is again brought into engagement with the dogs.

When the king pin is brought into engagement with the dogs, that is, when the tractor and semi-trailer are being again united, the king pin will engage the cam surfaces 44 and swing the dogs on their pivot to move the legs 28 in spaced apart position. As soon as the king pin comes in contact with the parts 44 and commences to swing the dogs 24 on their pivots 25, the pin 52 will be moved away from the pawl 46, allowing the pawl 46 to then again come into engagement with the pin 49. But the pin 49 will be prevented from engaging the keeper 48 because the spreading apart of the legs 28 does not move the block 30 a distance sufficient to permit the pin 49 to engage the keeper 48. Therefore, as soon as the legs have been spread apart the sufficient distance, the block 30, due to the action of the spring 40, will be caused to drop down in the space between the legs and fill this space and lock the dogs tightly about the king pin 16. The parts will then again be in locked position, as clearly shown in Fig. 2.

In Fig. 4 the view shows the first step in unlocking the device. In this figure the lever or arm 34 has been moved to unlocking position, whereby the block 30 is raised out of its position from between the legs 28 and the pawl 46 is in locking engagement with the pin 49. Fig. 5 shows the king pin moved partly out of engagement with the dogs, but has not yet moved a distance sufficient to cause disengagement of the pawl 46 and pin 49. Fig. 6 shows the parts in their normal inoperative non-locked position, while Fig. 2 shows the parts in locked and operative position.

Heretofore, fifth wheels have been cast, but it has been found that they can be more readily and more economically manufactured by making them out of sheet steel reenforced with bars and flanges. Therefore, a very convenient way in constructing the brackets 59 is by bending over side flanges 60, Fig. 3, juxtaposing angles 61 and then welding the ends of the angles to the plate and flange, as indicated at 62 and 63. The shaft or axle bearing 64 which receives the axle 13 may comprise a solid bored block or bearing which is welded to the flange and angle, as indicated at 65, Fig. 3.

That the device may be further strengthened and rendered more rugged, additional flanges 66, Fig. 2, may be bent from the body 17 and the connection between the rods 21 and the flanges 66 may be welded, as indicated at 67, Fig. 2. Also, the guide strip 37 may have its bent ends 68 welded to the body 17, as indicated at 69, Fig. 2.

The invention provides a positively operating strong and durable fifth wheel made principally from sheet metal and bent or formed to the desired configuration. The fifth wheel is rendered more rigid by the formation of flanges and the attachment thereto of certain standard stock bars. The parts are strong and durable in construction, operate smoothly and easily, and are not likely to get out of order. Furthermore, the location of the handle on one side of the fifth wheel permits ready access for the operation of the device. If it should be found more desirable and convenient, the device can be operated from the cab of the tractor by applying a pull cord to either the end of the shaft 29 or the handle 36 of the lever 34.

Changes may be made in the form, construction, and arrangement of the parts without departing from the spirit of the invention or sacrificing any of its advantages, and the right is hereby reserved to make such changes as fall within the scope of the following claims.

The invention is hereby claimed as follows:

1. A fifth wheel construction comprising a pair of plates, one of said plates being mounted on a tractor and the other plate being mounted on a trailer, a king pin mounted on the trailer plate, said tractor plate having an opening therein into which the king pin is received, dogs pivoted on the tractor plate and holding the pin when the pin is properly positioned in the opening, a locking bolt engaging the dogs for holding and maintaining the dogs in locked position and thereby operatively fasten the trailer to the tractor, means for urging the locking bolt toward locking engagement with the dogs, a lever pivoted to a part attached to said tractor plate for holding the locking bar out of engagement with the dogs to permit detachability of the trailer and tractor, said locking bar holding the rearward ends of the dogs together when the locking bar is out of locking engagement and the tractor and trailer are detached, and a pin carried by one of said dogs and engaging said lever, whereby to release the locking bar from the lever and allow it to engage the dogs.

2. A fifth wheel construction comprising a pair of plates, one of said plates being mounted on a tractor and the other plate being mounted on a trailer, a king pin mounted on the trailer plate, said tractor plate having an opening therein into which the king pin is received, dogs pivoted on the tractor plate and holding the pin when the pin is properly positioned in the opening, a locking bolt engaging the dogs for holding and maintaining the dogs in locked position and thereby operatively fasten the trailer to the tractor, means for urging the locking bolt toward locking engagement with the dogs, a lever pivoted to a part attached to said tractor plate for holding the locking bar out of engagement with the dogs to permit detachability of the trailer and tractor, said locking bar keeping the forward ends of the dogs in spread apart position when the locking bar is out of normal locked position, a pin carried by said locking bolt and engaging said lever for normally holding said lever in non-engaging position.

3. A fifth wheel construction comprising a pair of plates, one of said plates being mounted on a tractor and the other plate being mounted on a trailer, a king pin mounted on the trailer plate, said tractor plate having an opening therein into which the king pin is received, dogs pivoted on the tractor plate and holding the pin when the pin is properly positioned in the opening, a locking bolt engaging the dogs for holding and maintaining the dogs in locked position and thereby operatively fasten the trailer to the tractor, means for urging the locking bolt toward locking engagement with the dogs, a lever pivoted to a part attached to said tractor plate for holding the locking bar out of engagement with the dogs to permit detachability of the trailer and tractor, said locking bar keeping the forward ends of the dogs in spread apart position when the locking bar is held out of engagement and the tractor and trailer are detached, a pin carried by said locking bolt and engaging said lever for holding said lever in non-engaging position, a pin carried by one of said dogs and adapted for engagement with said lever for releasing the locking bar from the lever when the forward ends of said dogs are in spread position.

4. A fifth wheel construction comprising a pair of plates, one of said plates being mounted on a tractor and the other plate being mounted on a trailer, a king pin mounted on the trailer plate, said tractor plate having an opening therein into which the king pin is received, dogs pivoted on the tractor plate and holding the pin when the pin is properly positioned in the opening, a locking bolt engaging the dogs for holding and maintaining the dogs in locked position and thereby operatively fasten the trailer to the tractor, means for urging the locking bolt toward locking engagement with the dogs, a lever pivoted to a part attached to said tractor plate for holding the locking bar out of engagement with the dogs to permit detachability of the trailer and tractor, said locking bar keeping the forward ends of the dogs in spread apart position when the locking bar is out of engagement and the trailer is detached from the tractor, a pin carried by said locking bolt and engaging said lever for holding said lever in non-engaging position, a pin carried by one of said dogs and adapted for engagement with said lever for releasing the locking bar from the lever when the forward ends of said dogs are in spread position and permitting a part of the locking bar to engage the dogs, and a spring fastened to said lever and a part of said tractor plate for urging said lever in a predetermined direction.

5. A fifth wheel construction comprising a pair of plates, one of said plates being mounted on a tractor and the other plate being mounted on a trailer, a king pin mounted on the trailer plate, said tractor plate having an opening therein into which the king pin is received, dogs pivoted on the tractor plate and holding the pin when the pin is properly positioned in the opening, a locking bolt engaging the dogs for holding and maintaining the dogs in locked position and thereby operatively fasten the trailer to the tractor, means for urging the locking bolt toward locking engagement with the dogs, a lever pivoted to a part of said trailer plate for holding the locking bar out of engagement with the dogs to permit detachability of the trailer and tractor, said locking bar keeping the forward ends of the dogs in spread-apart position when the locking bar is out of normal locked position, and a pin carried by said locking bolt and engaging said lever for normally holding said lever in nonengaging position.

6. A fifth wheel construction comprising a pair of plates, one of said plates being mounted on a tractor and the other plate being mounted on a trailer, a king pin mounted on the trailer plate, said tractor plate having an opening therein into which the king pin is received, dogs pivoted on the tractor plate and holding the pin when the pin is properly positioned in the opening, a locking bolt engaging the dogs for holding and maintaining the dogs in locked position and thereby operatively fasten the trailer to the tractor, means for urging the locking bolt toward locking engagement with the dogs, a lever pivoted to a part of said trailer plate for holding the locking bar out of engagement with the dogs to permit detachability of the trailer and tractor, said locking bar keeping the forward ends of the dogs in spread-apart position when the locking bar is held out of engagement and the tractor and trailer are detached, a pin carried by said locking bolt and engaging said lever for holding said lever in non-engaging position, and a pin carried by one of said dogs and adapted for engagement with said lever for releasing the locking bar from the lever when the forward ends of said dogs are in spread-apart position.

7. A fifth wheel comprising a body having a slot therein, a pair of oppositely disposed dogs pivoted intermediate their ends to said body, there being a dog arranged on each side of said slot, the rear ends of said dogs being forced together forming a bearing for a king pin, the forward ends of said dogs being forced apart when the rear ends are forced together, a locking bolt arranged between the spread of the forward ends of the dogs to prevent their rear ends from spreading, a latch pivoted to a part attached to the body and engaging said bolt to hold said bolt away from said forward ends and means on the dogs to release the latch when the dogs pass a predetermined point in the course of their opening motion.

EDWARD F. KING.